United States Patent [19]

Columbare et al.

[11] Patent Number: 4,724,164

[45] Date of Patent: Feb. 9, 1988

[54] METHODS OF MIRROR MANUFACTURE AND PRODUCTS MADE THEREBY

[75] Inventors: Stephen J. Columbare; Frank Workens, both of Jamestown, N.Y.

[73] Assignee: Falconer Glass Industries, Inc., Falconer, N.Y.

[21] Appl. No.: 792,442

[22] Filed: Oct. 29, 1985

Related U.S. Application Data

[63] Continuation of Ser. No. 586,405, Mar. 5, 1984, abandoned.

[51] Int. Cl.$^4$ .............................................. B05D 5/06
[52] U.S. Cl. ..................................... 427/165; 427/169; 427/304; 427/305; 427/378; 427/383.5; 427/443.1; 427/443.2
[58] Field of Search ............... 350/641, 642, 600, 590, 350/1.7, 320; 427/168, 305, 169, 165, 405, 162, 378, 304, 383.5, 383.3, 443.1, 443.2; 428/912.2

[56] References Cited

U.S. PATENT DOCUMENTS

| | | | |
|---|---|---|---|
| 2,759,845 | 8/1956 | Hilemn | 427/162 |
| 3,212,918 | 10/1965 | Tsu et al. | 427/305 |
| 3,467,540 | 9/1969 | Obersdorf | 427/305 |
| 3,485,665 | 12/1969 | DeAngelo et al. | 427/305 |
| 3,846,152 | 11/1974 | Franz | 350/1.7 |
| 3,900,601 | 8/1975 | Franz et al. | 427/168 |
| 3,920,864 | 11/1975 | Greenberg et al. | 427/168 |
| 4,009,947 | 3/1977 | Nishida et al. | 350/642 |
| 4,285,992 | 8/1981 | Buckwalter | 427/168 |

*Primary Examiner*—Janyce A. Bell
*Attorney, Agent, or Firm*—Buell, Ziesenheim, Beck & Alstadt

[57] ABSTRACT

A method for making mirrors and a mirror product, free from black edge and similar adhesion problems, are provided by coating a metal film onto one side of a glass sheet and then heating the glass and film with convection heating to a temperature above 200° F. using hot air.

6 Claims, No Drawings

METHODS OF MIRROR MANUFACTURE AND PRODUCTS MADE THEREBY

This application is a continuation of our copending application Ser. No. 586,405, filed Mar. 6, 1984, now abandoned.

This invention relates to methods of mirror manufacture and products made thereby and particularly to a method of improving the adhesion of metal layers to glass to prevent separation over time of the metal from the glass and eliminate the problem of "black edge" and "edge creep".

Mirrors have been manufactured for many years by cleaning a glass surface to be coated and then applying a layer of silver, a backing layer of copper or other metal, drying the coatings and applying a protective layer of waterproofing paint. The two metal layers are applied from plating solutions by reduction reactions in a well known manner. Drying of the coated mirror has historically been done by using radiant and/or infra red heaters from the glass substrate side of the mirror to dry the metal film by conduction of heat through the glass substrate. The temperature of the mirror is elevated in an effort to dry and de-gasify the metallic film. Following drying a protective layer of waterproofing paint has generally been applied.

Unfortunately, there has been a continuing problem with the metal layers lifting from the glass, particularly along the edges and particularly in geographic areas of high humidity, such as along the seashore. This has been a continuing and serious problem over many years and much work has been done in an effort to solve the problem. It is believed that the problem is the result of failure to remove either all of the moisture or gases from the metal film or perhaps some slight reaction after the film has been completed and coated with paint. In an effort to solve the problem, paints have been formulated to include amino compounds designed to absorb moisture. This has been counter productive because the resulting paint film was not waterproof and thus did not fully accomplish its intended purpose. Some manufacturers have delayed fabricating mirrors for periods of up to 72 hours in order to permit degasification and drying without success. Other solutions have been attempted without success.

We have discovered a method of making mirrors which substantially completely eliminates this problem of the prior art. We have found that by convection heating of the glass and substrate, rather than by the conventional radiant or infra-red heating, we can eliminate the problem of metal separation from the glass and the corresponding problem of black edges and edge creep. By our practice we have achieved a level of 100% adhesion of metal on glass in mirror manufacture on a production basis, something which has never before been achieved in the mirror industry to our knowledge.

We provide a process of making mirrors which comprises the steps of coating a glass surface with silver and a backing metal by any conventional process, passing the coated glass through a convection type oven, forcing hot air directly onto the metal film on the glass in said oven, removing the mirror from the oven and applying a waterproof paint on the metal surface. We sensitize the glass with a stannous chloride or other similar sensitizing solution prior to applying the silver. We, preferably, apply a layer of copper on the silver as the backing metal. Preferably, the temperature of the forced air is controlled for the given thickness of the glass and the speed of the conveyor being run. For example, we prefer to use 350° F. air for 45 seconds on quarter inch glass. On heavier glass we use a longer time; on thinner glass we use a shorter time. Preferably, the time and temperature of the convection air are adjusted so that the temperature of the metal film and the glass exceeds about 212° F. in the oven. The percentage of recirculated air to fresh air is preferably controlled to take maximum advantage of available BTU's and still provide air which is dry enough to efficiently evaporate any moisture present on the mirror, drive off any gases and firmly bond the metal film to the glass.

The practice of this invention can perhaps be best understood by reference to the following example:

EXAMPLE I

Quarter inch glass sheets of mirror stock were sprayed with a sensitizing film of stannous chloride (0.1% in $H_2O$) and then coated with silver in the usual manner, followed by coating with a layer of copper in conventional manner. The thus plated glass was passed through a convection type oven using forced hot air at 350° F. applied directionally to the metal film for at least 45 seconds until the glass and metal film reach a temperature in excess of 200° F. The glass was removed from the furnace, cooled and tested for adhesion by applying a piece of Scotch tape to the metal and then pulling the tape off and measuring the surface removal. On the glass processed according to this example no surface metal removal could be measured. On standard process mirrors of the prior art there is always some surface metal removal using this test.

EXAMPLE II

A ¼" mirror made in the conventional manner and dried using the conventional radiant heat furnaces of the prior art was tested for adhesion and found to lose about 5% on the Scotch tape test. The mirror was then passed through a convection furnace as in Example I and tested for adhesion and found to be free of loss. Thus, the use of the method of this invention can cure the problems of the prior art even after they have occurred in a mirror made in the conventional way.

By the use of this convection type heating using hot forced air applied directly to the metal film we have achieved a level of adhesion (substantially 100%) never before achieved, on a production basis, by the mirror industry.

The temperature of the forced air is controlled for the given thickness of glass and the speed of the conveyor being run so that a glass and metal temperature exceeding 200° F. is always maintained. By controlling the percentage of recirculated air to fresh dry air, we are able to take advantage of the maximum available BTU's and yet provide air which is sufficiently dry to evaporate efficiently any moisture present, dry off any gases and liquids being evolved and bond the metal film to the glass.

By directing the heated air at the metal film, we have taken advantage of the high thermal conductivity of the metal film and accomplished effective drying of the metal film in far less time than the inefficient prior art systems. We believe that one of the problems of prior art practices was the need, or at least the perceived need, to apply radiant heat to the glass side of the mirror where a large part was reflected back through the glass without reaching the secondary coating of copper or the like other metal. As a result, the metal film was not dried and degassified.

Our invention has drastically reduced the frequency of black edge or edge creep that has plagued the industry for years. It is evidence by the increased performance of mirrors made by this invention vs. mirrors made by conventional prior art processes in ammonia salt spray and standard salt spray tests used by the industry for measuring these problems.

Another very important advantage of mirrors of this invention is that they can be immediately fabricated on cooling whereas it has been the practice to delay fabrication for up to 72 hours when using conventional processes. Thus, this invention provides a very significant reduction in process storage time and space.

In the foregoing specification we have set out certain preferred embodiments and practices of our invention, however, it will be understood that this invention may be otherwise embodied within the scope of the following claims.

We claim:

1. The method of making mirrors to eliminate black edge or edge creep comprising the steps of:
    (a) applying "a light reflective nontransmitting" film of at least one metal on one side of a sheet of glass; and
    (b) heating the metal film and glass substrate "free from applied oxidation agents", to a temperature above 200° F. and to complete dryness by convection heating with high temperature gases flowing across the metal film to provide a metal film which is substantially free from metal removal from the applied film on applying and removing a strip of pressure sensitive tape from the metal surface.

2. A method as claimed in claim 1 wherein the metal film is a film of silver having thereon a film of copper on the side of the silver film opposite the glass.

3. The method as claimed in claim 1 or 2 wherein the glass is first treated with a sensitizing solution of stannous chloride prior to applying the film of at least one metal.

4. The method as claimed in claim 1 or 2 wherein hot air is forced directly against the metal film.

5. The method as claimed in claim 3 wherein hot air is forced directly against the metal film.

6. The method as claimed in claim 1 or 2 wherein the high temperature gases are at a temperature above 350° F.

* * * * *

UNITED STATES PATENT AND TRADEMARK OFFICE
CERTIFICATE OF CORRECTION

PATENT NO. : 4,724,164

DATED : February 9, 1988

INVENTOR(S) : STEPHEN J. COLUMBARE, FRANK WORKENS

It is certified that error appears in the above-identified patent and that said Letters Patent is hereby corrected as shown below:

Column 4, line 1, claim 1, delete " "a light reflective non-transmitting" ".

Column 4, line 4-5, claim 1, delete " "free from applied oxidation agents" ".

Signed and Sealed this

Thirtieth Day of August, 1988

Attest:

DONALD J. QUIGG

*Attesting Officer*   *Commissioner of Patents and Trademarks*